Dec. 15, 1925.                                                          1,565,331
R. SAVY
EMPTYING DEVICE FOR MELANGEURS
Filed March 21, 1923        2 Sheets-Sheet 1
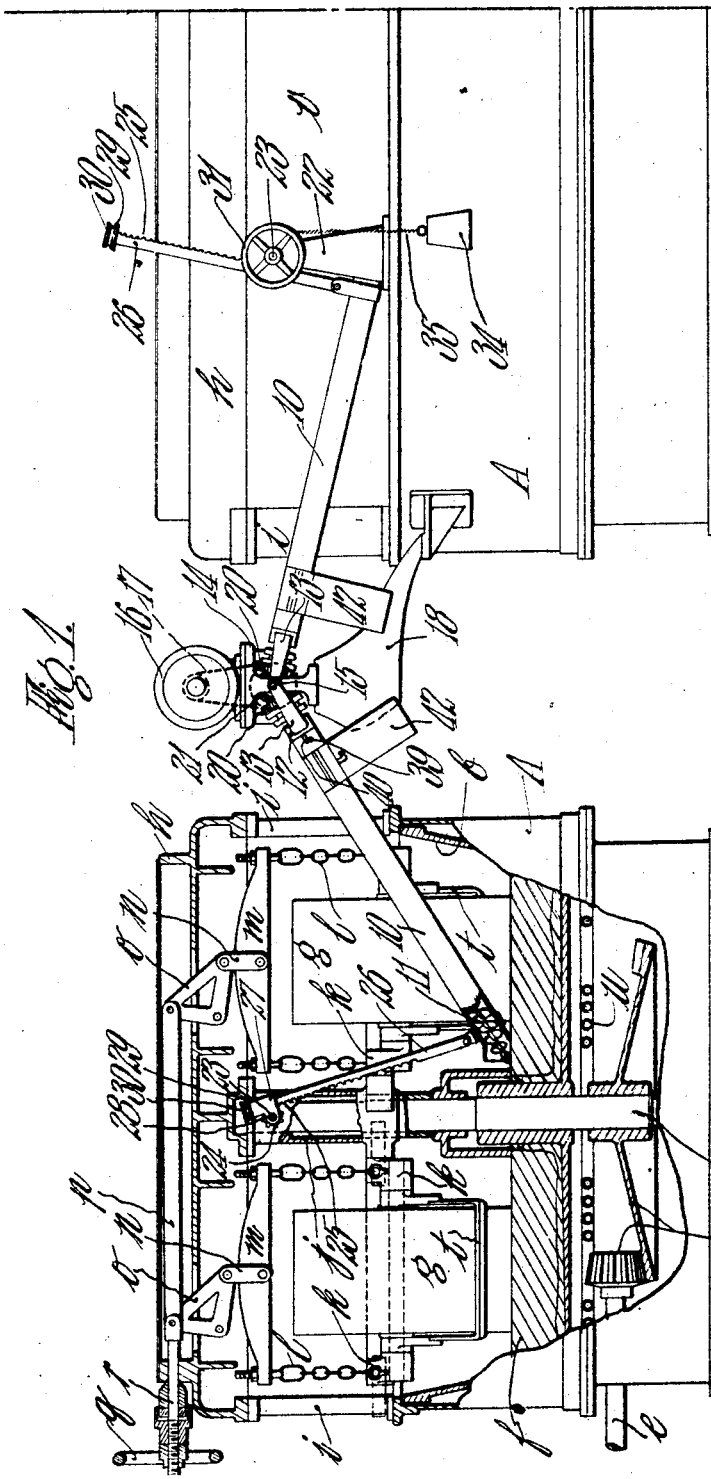
INVENTOR
Robert Savy
BY Chapin & Neal
ATTORNEYS Dec. 15, 1925.
R. SAVY
1,565,331
EMPTYING DEVICE FOR MELANGEURS
Filed March 21, 1923   2 Sheets-Sheet 2
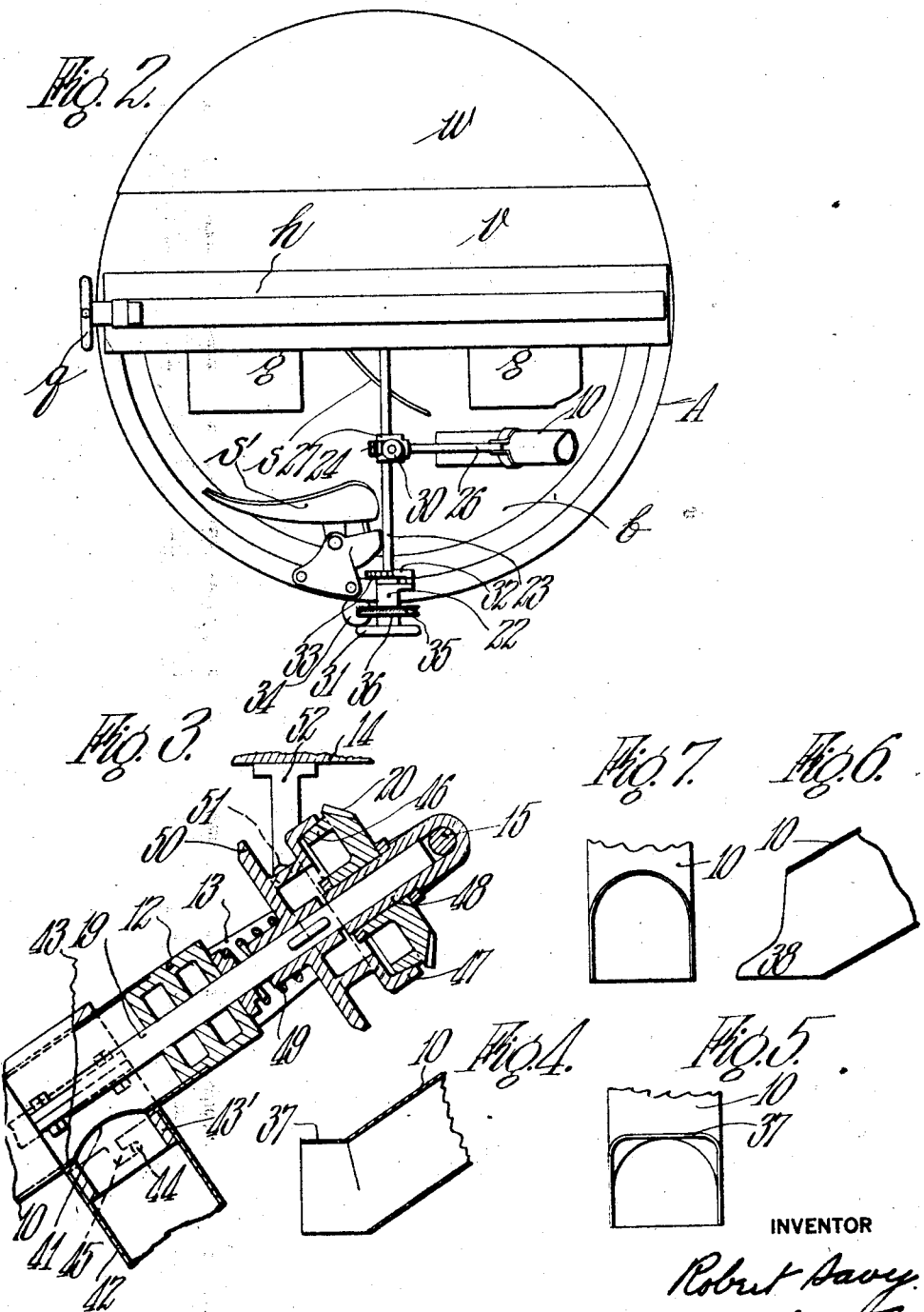
INVENTOR
Robert Savy
BY Chapin & Neal
ATTORNEYS Patented Dec. 15, 1925.

1,565,331

UNITED STATES PATENT OFFICE.

ROBERT SAVY, OF PARIS, FRANCE.

EMPTYING DEVICE FOR MELANGEURS.

Application filed March 21, 1923. Serial No. 626,692.

*To all whom it may concern:*

Be it known that I, ROBERT SAVY, a citizen of the Republic of France, and a resident of Paris, in the Department of Seine, France, have invented certain new and useful Improvements in Emptying Devices for Melangeurs, of which the following is a specification.

This invention relates to improvements in melangeurs and is more particularly concerned with the provision of means for conveniently and expeditiously removing from the pan of the melangeur the material which has been treated therein.

The melangeur is a machine well known in the confectionery art and is used in the manufacture of chocolate for the purpose of mixing the various ingredients and kneading them together into paste form. These ingredients are generally cocoa liquor, cocoa butter and sugar but occasionally include milk as well. These ingredients, when mixed, form a thick viscous pasty mass of substantially putty-like consistency, which does not readily flow and cannot readily be removed from the melangeur with pumps of ordinary types. The present practice is to shovel the mixture out of the melangeur pan,—a comparatively slow operation, manually performed. The mixture, taken from the melangeur, goes to refiners of various types which amalgamate and refine the ingredients into a smooth, fine paste.

The melangeur generally comprises a large pan which revolves about its vertical axis and contains the ingredients to be mixed. On the base of the pan there is usually a thick bed or facing of stone and resting on this facing are a pair of rolls, which are usually of stone and are located one on each side of the vertical axis of the pan in substantially diametrically opposed relation. These rolls turn about their own horizontal axes by frictional engagement with the stone bed but do not revolve around the axis of the pan. The latter, in turning, carries the mixture in under the heavy rolls, whereby the paste will be flattened out into a broad, thin layer. Scrapers are provided to cooperate with the rotating bed and throw the paste, from both the center and the periphery of the pan, inwardly into the path of the rolls, thus forming a narrow thick layer to be again flattened out by the rolls. The action is of a mixing and kneading nature as distinguished from a refining action, which is produced in machines of a somewhat similar nature having cooperating rolls and bed. In all these refining machines the bed is stationary and the mixture is relatively more fluid in consistency so that it can flow out, or be otherwise removed, from the pan through a gate in its periphery. With the melangeur, due to the rotary pan, the gate cannot readily be used and the mixture does not readily flow. Consequently, the usual expedients for removing the contents are not feasible and the contents have to be manually removed, as by shovelling.

The general object of the invention is to provide means for removing the mixed paste from a melangeur automatically.

More particularly, it is an object of the invention to accomplish this function by means of a screw conveyer working inside a tube, one end of which can be positioned in the pan, preferably in such a manner relatively to the direction of rotation of the pan that the mixture is thrown into the inlet end of the tube with considerable pressure. With such pressure upon the material at the inlet end of the tube, the screw is a particularly effective medium for conveying the material through the tube, especially where, as here, the material is of a thick viscous nature not readily handled by ordinary means.

Another object of the invention is to provide an emptying device of the general class defined, which can be moved into and out of the pan, when and as desired, together with means whereby the device can be gradually lowered into the paste in the pan during the removal of the paste and located at various regulable distances above the bed of the pan.

Another object of the invention is to provide a control for the mechanism which drives the screw conveyer, characterized in that the latter is automatically set in motion after the inlet end of the tube has been moved into the pan and positioned a predetermined distance above the bed thereof, and in that the screw is automatically stopped after such end of the tube has been moved away from the bed of the pan a distance greater than said predetermined distance.

Another object of the invention is to provide a double installation for a pair of melangeurs arranged side by side, characterized by a pivotal mounting of the two tubes for up and down swinging motion about a common axis coincident with that of a common drive shaft for the two conveyers.

Other objects and advantages will appear in the following description and in the illustrative embodiment of the invention in the accompanying drawings, in which,—

Fig. 1 is an elevational view, partly in section, of two melangeurs, showing the invention as applied thereto;

Fig. 2 is a plan view of one of the melangeurs;

Fig. 3 is an enlarged fragmentary sectional view of the upper end of the tube of the emptying device;

Figs. 4 and 5 are sectional and front elevational views respectively, of the inlet end of the tube; and Figs. 6 and 7 are views, taken similarly to Figs. 4 and 5, showing a modification in the construction of the inlet end of the tube.

Referring to these drawings in detail, the melangeur, illustrated therein, is of a standard type too well known in the art to require extended description herein. Briefly, A is the frame and, housed within and encompassed by the latter, is the pan $b$ fixed on a vertical shaft $c$, which is rotated through bevel gears $d$ from the main driving shaft $e$. In the base of pan $b$ is a thick bed $f$, usually of stone, and resting upon this bed are two heavy rolls $g$, usually also of stone. Extending diametrically across the frame A is a bridge $h$, supported from said frame by two columns $i$, and depending centrally from bridge $h$ is a post $j$. Each roll is disposed between the latter and one of the columns $i$ and has its ends rotatably mounted in the free ends of links $k$, which are pivoted to the adjacent post or column, as the case may be. The free ends of each pair of links $k$ are suspended by chains $l$ from the ends of a bar $m$, which is centrally connected by a link $n$ to a bell crank lever $o$. Both levers $o$ are connected together by a link $p$ and both may be simultaneously moved to regulate the pressure of the rolls on the bed by a hand wheel $q$, operating on a screw $r$, connected to one of the levers $o$. Inner and outer stationary scrapers $s$ and $s'$ (Fig. 2) are provided in cooperative relation with bed $f$ and the outer scraper $s'$ is usually curved upwardly and inwardly, as shown, to turn the paste over as well as to move it into the path of rolls $g$. Scrapers $t$ are customarily provided for each roll $g$. In the interior of the casing A and below pan $b$, heating coils $u$ are usually provided to control the temperatures and covers $v$ and $w$, enclose the upper, and otherwise open, end of pan $b$.

The emptying device includes a tube 10 and a screw 11 rotatably mounted therein. The upper end of this tube is closed by a plug 12 (Fig 3) which at opposite sides are provided with arms 13, forming a fork. Supported by, and rotatably mounted in, a suitable frame 14 is a drive shaft 15, which passes through the ends of arms 13 and functions to support tube 10, and to so support it that its lower, or inlet end, can be raised or lowered with respect to bed $f$. While shaft 15 may be driven in any suitable manner, it is conveniently driven from a motor 16 mounted on top of frame 14 and suitable connections 17 from the motor to shaft 15. The frame 14, as shown, is supported by an arch-like frame 18, which extends between the two melangeurs and is secured to the side walls of the frames A thereof. Also, a second tube 10, similarly mounted on the shaft 15, is provided. Obviously, where the double installation is not needed or desired, one tube 10 may be omitted and frame 14 may be supported in any other suitable manner. Each screw 10 has a shaft extension 19 which passes through plug 12 and is disposed between the arms 13. Each extension 19 is driven, in a manner later to appear, by a bevel gear 20 and both of these gears are driven from a common bevel gear 21 on driving shaft 15. It will be obvious that the tube 10 can be swung about shaft 15 as an axis without interrupting the driving connections described.

The mechanism for controlling the raising and lowering of the tube will next be described. Fixed to the rim of frame A is an upstanding bracket 22 and a shaft 23, rotatably mounted at one end in bracket 22, extends across the pan and has its other end rotatably mounted in the central post $j$. Fixed on shaft 23, intermediate its ends, is a pinion 24, which meshes with a rack 25 formed in a cylindrical bar 26. The rack and pinion are held in engagement by a bracket 27, in which the bar 26 is slidably received,—such bracket having a pair of ears 28 which loosely encompasses shaft 23 and between which the pinion 24 is mounted. The lower end of bar 26 is pivotally connected to the tube 10 near its inlet end. The upper end of bar 26 is threaded to receive a nut 29 and lock nut 30,—the former by engagement with the top of bracket 27 forming an adjustable abutment to limit the extent of the downward movement of the tube. The nut 29 is usually adjusted so as to just prevent the lower end of the tube from rubbing on bed $f$. Shaft 23 has fixed thereon a hand wheel 31, by means of which the mechanism described may be conveniently operated. To hold the tube at various positions in its range of swinging movement, any suitable means may be provided and, as an example of one such means, a pawl 32, pivotally mounted on bracket 22 is provided which pawl cooperates with a ratchet 33 fixed on shaft 23. The weight of the tube may be counterbalanced, as by a weight 34 attached by a cord 35 to a drum 36 on shaft 23, in which case the ratchet 33 is not necessarily essential.

The lower end of tube 10 may be variously formed and different classes of work may make it desirable to modify the shape of the inlet. For pastes which are relatively soft, a sort of funnel 37, of substantially the cross sectional shape of an inverted U, is provided on the lower end of tube 10. The cross sectional shape chosen allows the material to readily gain access to screw 11, the lower end of which is made substantially conical (Fig. 1) for facilitating the ingress of material. For relatively hard pastes, it is preferred to enlarge the opening somewhat, as shown in Figs. 6 and 7, by cutting away the upper portions of the funnel leaving merely two spaced cheeks or side walls 38. If the pressure of the material against the screw 11 is excessive, tending to cause jamming, the use of the cheeks is advisable as tending to prevent such action because the material can readily flow over the cheeks back into the pan and relieve the pressure.

The tube 10 is preferably mounted so that it can be readily removed from screw 11 for cleaning or other purposes. This feature has been illustrated by the pins 39 on plug 12 which enter bayonet slots 40 in tube 10. Various other expedients for accomplishing this function will readily occur to those skilled in the art. Adjacent the upper end of tube 10 an opening 41 (Fig. 3) is provided through which the material conveyed by screw 11 may be discharged. Desirably, a chute is associated with such opening, as the tube 42, which is removably attached to tube 10. As shown a two part member 43 surrounds tube 10 and is provided with a sleeve portion 43' which encompasses opening 41 and tube 42 is detachably connected to this part as by pins 44 in the latter which engage in bayonet slots 45 in tube 42.

For the purpose of controlling the rotation of screw 11 from the swinging movement of tube 10, the bevel gear 20 does not directly drive the screw, or its shaft extension,—but is provided with a part 46 (Fig. 3) which forms one element of a cone clutch,—the other element being shown at 47. Member 46 is freely rotatable on a bushing 48 but is suitably held against axial movement thereon, as indicated. Member 47 has a flange 50 with which a roll 51, mounted on a bracket 52 secured to frame 14, is adapted to coact to open or separate the clutch members 46 and 47. The arrangement is such that as the tube 10 is lowered into pan $b$, the screw 11 will be set in motion shortly before the inlet end of the tube dips into the paste in the pan. Conversely, after the tube has been raised out of the paste, the rotation of the screw is stopped. The disengagement of the clutch members 46 and 47 does not, however, occur immediately after the tube is raised above the normal level of paste but preferably a little leeway is provided to allow the screw to empty tube 10.

It will be noted from Fig. 2 that tube 10 has its inlet end so disposed relatively to scrapers $s$ and $s'$ that the material is directed by the latter into the inlet of the tube. In other words, the arrangement is such that a lateral movement of the tube to radially traverse the bed is not required.

In operation, the various ingredients to be mixed are placed in pan $b$ and the melangeur is operated in the customary manner,—the tube 10 being elevated out of the pan until the normal operation of the melangeur is completed. When the tube is raised, as shown in the right hand part of Fig. 1, the covers $v$ and $w$ may be applied and removed without interference. To empty pan $b$ these covers are removed and, while the pan $b$ is still rotating, the tube 10 is lowered. Usually, the tube is rapidly lowered until screw 11 has been set in motion by the approach of the inlet end of the tube to the paste in pan $b$. Then the lowering action is preferably gradual. The inlet of the tube is not plunged to its full depth in the paste but is worked into the paste step by step in order not to unduly crowd the screw 11 with paste. The gradual feed is desirable to insure against jamming. A screw works effectively on heavy viscous substances but to secure effectiveness there must be pressure of the material on the screw and such pressure is supplied by the rotation of the pan,—the direction of rotation being such as to throw the material into the tube. The material is carried up the latter by the screw until it reaches opening 41 through which the material falls, passing through chute 42,— into a suitable receptacle (not shown) which may advantageously be the hopper of a refiner. After the material has been removed from the pan the tube is raised and eventually the rotation of the screw is stopped, preferably after an interval sufficient to allow the tube to be completely emptied.

The invention has been disclosed herein, in an embodiment at present preferred, for illustrative purposes but the scope of the invention is defined by the appended claims rather than by the foregoing description.

I claim:

1. Apparatus for removing material from a movable member, comprising, conveying means having its receiving end overlying said member and movable toward and away from the same, means for positively driving said conveying means independently of the movement of said member during a predetermined range only of the movement of said end, and controlling means for said driving means operable to start the conveying means as said end enters said range on approaching said member and to stop said conveying means as said end leaves said range in its movement away from said member.

2. An emptying device for rotatable pans, comprising a tube the inlet of which is movable into the pan and into the path of the material carried thereby, a screw rotatable in said tube, driving means for said screw, and means for controlling the driving means so that the screw is set in motion as the tube is moved downwardly in the pan and stopped during upward movement of the tube.

3. An emptying device for rotatable pans, comprising a cylindrical tube mounted so that its receiving end may be swung toward and away from the base of the pan, said end terminating with laterally spaced vertical cheek plates the lower edges of which parallel said base and are inclined to the axis of said tube, and a screw rotatable in said tube said edges adapted to rest upon said base as the receiving end of said tube reaches the limit of its movement into the pan, the space between the lower edges of said plates being open and exposed to the base of said pan.

4. An emptying device for rotatable pans, comprising a cylindrical tube mounted so that its receiving end may be swung toward and away from the base of the pan, said end terminating with a portion having substantially the cross-sectional shape of an inverted U, the lower edges of which are adapted to lie parallel with said bed and in inclined relation to the axis of said tube, and a screw rotatable in said tube.

5. An emptying device for pans, comprising, a tube, a support adjacent the pan to which one end of the tube is pivoted for swinging movement so that the other end of the tube may move toward and away from the pan, a screw rotatably mounted in said tube and provided with a substantially conical portion disposed at the inlet end of said tube and adapted to lie parallel with and closely adjacent the base of the pan when said tube is moved to the limit of its inward movement into the pan, and means for rotating said screw.

6. An emptying device for pans, comprising, a tube, a support adjacent the pan, a member pivotally connected to said support for swinging movement, means connecting one end of said tube and member for convenient attachment and detachment, the other end of said tube overlying the pan and being movable toward and away from the latter, a screw rotatably mounted in said tube and means for rotating said screw.

7. An emptying device for pans, comprising, a tube, a support adjacent the pan, an exit orifice provided in said tube, a chute removably attached to the tube and associated with said orifice, a member pivotally connected near one end to said support for swinging movement, the other end of said tube overlying the pan and being movable toward and away from the latter, a screw rotatably mounted in said tube and means for rotating said screw.

ROBERT SAVY.